P. W. TIERNEY.
FOLDING CAMERA.
APPLICATION FILED JUNE 21, 1918.
1,279,788.
Patented Sept. 24, 1918.
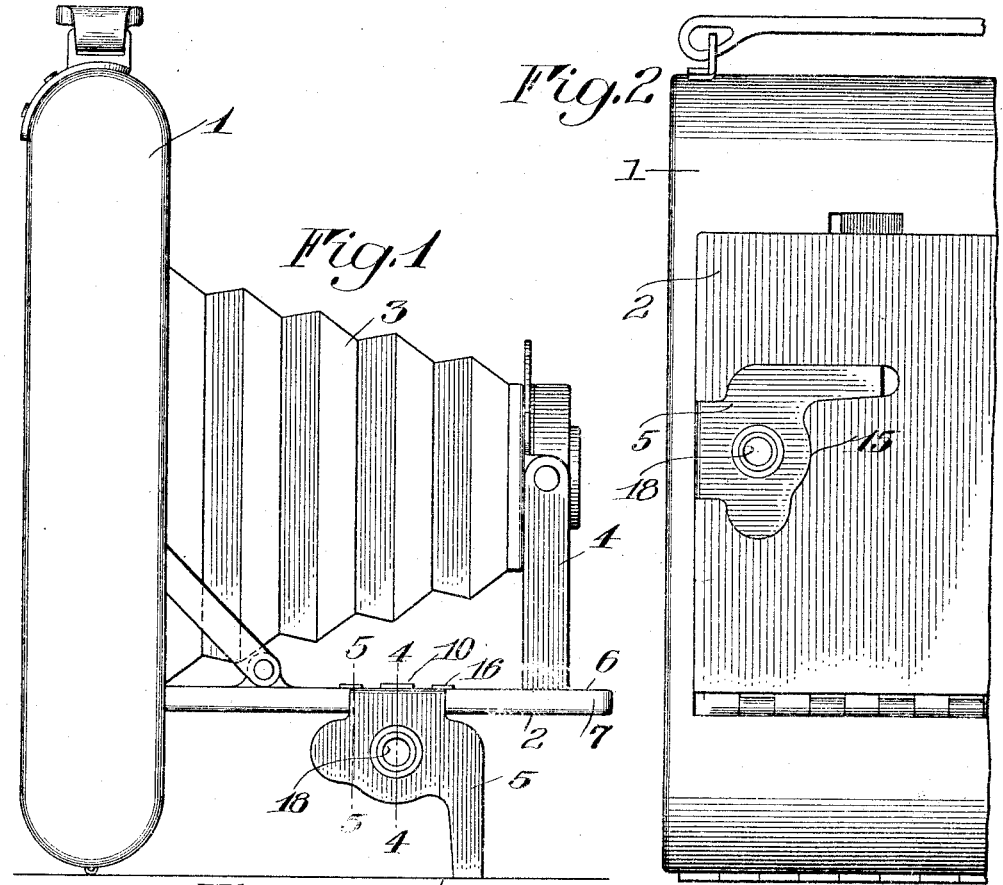
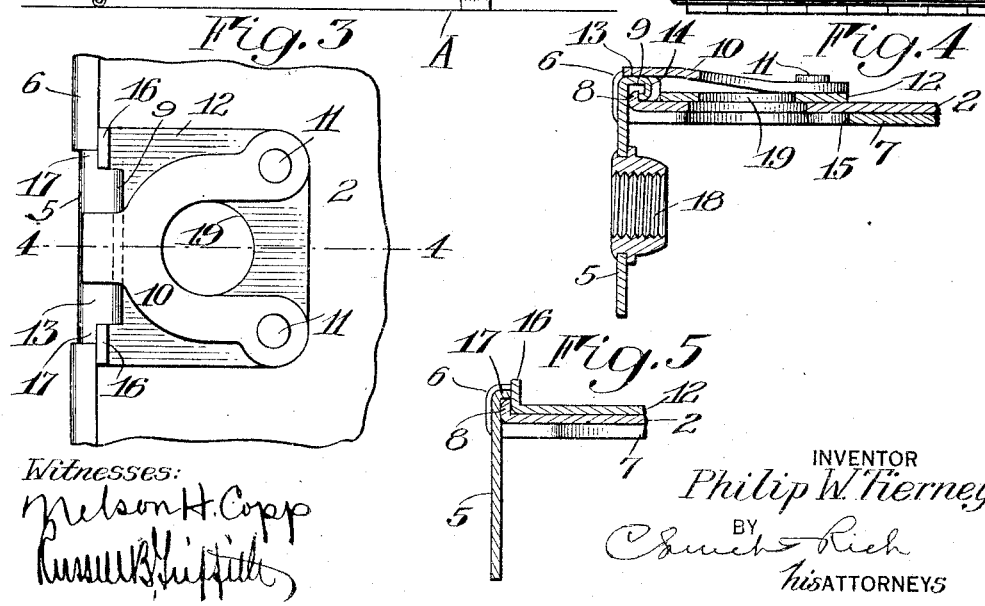
Witnesses:
Nelson H. Copp
INVENTOR
Philip W. Tierney
BY
his ATTORNEYS

UNITED STATES PATENT OFFICE.

PHILIP W. TIERNEY, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,279,788.  Specification of Letters Patent.  Patented Sept. 24, 1918.

Application filed June 21, 1918. Serial No. 241,140.

*To all whom it may concern:*

Be it known that I, PHILIP W. TIERNEY, of Rochester, in the county of Monroe and State of New York, have invented certain new and useful Improvements in Folding Cameras; and I do hereby declare the following to be a full, clear, and exact description of the same, reference being had to the accompanying drawings, forming a part of this specification, and to the reference-numerals marked thereon.

My present invention relates to photography and more particularly to photographic hand cameras of the folding type in which the field of exposure is oblong, requiring the camera to be held in one position for subjects of greater height than breadth and in another position for subjects greater in breadth than in height. A leg is provided on the hinged bed of such cameras so that when extended and in one position, the camera is supported partly on this leg and partly on the body. My present invention has for its object to improve the construction of a folding leg of this kind and to utilize the two positions of the leg for supporting the camera on a tripod or similar base in either of the positions above mentioned as required for different subjects.

To these and other ends the invention resides in certain improvements and combinations of parts all as will be hereinafter more fully described, the novel features being pointed out in the claims at the end of the specification.

In the drawings:

Figure 1 is a side elevation of a folding camera constructed in accordance with and illustrating one embodiment of my invention, the same being extended and supported in one of its operative positions;

Fig. 2 is a front view thereof in folded position;

Fig. 3 is an enlarged fragmentary view of a portion of the camera bed;

Fig. 4 is a section on the lines 4—4 of Fig. 1 and Fig. 3, and

Fig. 5 is an enlarged section on the line 5—5 of Fig. 1.

Similar reference numerals throughout the several views indicate the same parts.

Referring more particularly to Figs. 1 and 2, 1 indicates the shallow camera body; 2 the hinged front cover that closes the bellows chamber as shown in Fig. 2 when the camera is folded and that also serves as a bed, as shown in Fig. 1, when the camera is extended; 3 indicates the collapsible bellows and 4 is the front that carries the lens and slides upon the bed 2 to be folded within the body. When the camera is upright, as in Fig. 1, to take a tall object, the bed 2 is parallel with but spaced from the supporting surface A upon which the body rests and it is so maintained by a folding leg 5 which is constructed and mounted as follows:

The usual side flange 6 of the bed and its leather covering 7 are cut away or reduced at one edge to provide a shallow rounded flange 8 shown in Fig. 4. Coöperating therewith to ride thereon and provide a pivot for the leg 5 is a curled flange 9 on the latter. The said two coöperating flanges are held in engagement with each other by a flat leaf spring 10 riveted at 11 to a mounting plate 12 which latter is also held to the bed 2 by the said rivets 11. The leg 5 may thus be held in the operative position of Figs. 1, 4 and 5 with the spring 10 bearing upon a flat surface 13 of the flange 9 or in the folded position of Fig. 2 with the spring bearing upon a relatively angularly disposed flat surface 14 of the flange 9 in which last mentioned position the leg lies within a profile recess 15 in the leather covering 7 of the bed and against the under surface of the bed plate 2.

The mounting plate 12 is provided with two flanged abutments 16 that furnish another set of flanges on the bed 2, and when the leg is in its operative position, flanges 17 thereon formed by shoulders cut into the double flange 9 engage these flanges 16 as stops to limit the unfolding movement of the leg as clearly shown in Fig. 5.

In the further practice of my invention, I secure the threaded socket 18 for the reception of the screw plug on a tripod or other camera support in the body of the leg 5, the spring 10, plate 12, bed 2 and leather cover 7 being all recessed as indicated generally at 19 in Fig. 4, for the reception of the projecting portion of this plug when the leg is folded against the bed. It will be seen at once that this furnishes a means of fixing the camera on a tripod either in the erect position of Fig. 1 or on its side, for when the leg 15 is folded against the bed 2, as in Fig. 2, and the camera is extended as in Fig. 1, the socket will open downwardly, while with the leg extended as in Fig. 1, the socket will open laterally and be adapted to receive the vertically disposed attachment screw on the tripod when the camera is turned on its side to photograph a subject greater in width than in height. Furthermore, once the tripod screw is engaged in the socket, the whole camera may be turned from one of its positions to the other on the hinge 8—9 of the leg 5 without detaching the camera from the tripod.

It will be noted that the parts entering into the mounting of the leg 5 on the camera bed are simple stampings and may be easily assembled, the spring 10 being the key part which holds the parts assembled.

The function of the engagement of the flanges 16 and 17 on the respective parts is more than to simply limit the outward pivoting of the leg in the use thereof indicated in Fig. 1, for it will be understood that when the camera is supported on its side on the tripod, the full weight thereof is borne by this stop device which, with the construction shown, may be readily made strong enough to assume it.

I claim as my invention:

1. In a folding camera, the combination with a body adapted to rest upon a supporting surface and a hinged bed in the body having an extended position parallel to but spaced from such surface, of a folding leg on the bed adapted to contact the supporting surface, said leg being provided with a socket to receive the attaching element of a tripod or camera support and so maintain the camera in a fixed upright position when the leg is folded and a fixed position on its side when the leg is extended.

2. In a folding camera, the combination with a body adapted to rest upon a supporting surface and a hinged bed in the body having an extended position parallel to but spaced from such surface, of a folding leg on the bed adapted to contact the supporting surface, the leg and the bed being provided, respectively, with interlocking flanges forming a pivot, and a leaf spring on one of said elements engaging the flange of the other to hold the flanges in engagement with each other and to maintain the leg in either its folded or its extended position.

3. In a folding camera, the combination with a body adapted to rest upon a supporting surface and a hinged bed in the body having an extended position parallel to but spaced from such surface, of a folding leg on the bed adapted to contact the supporting surface, the leg and the bed being provided, respectively, with two sets of coöperating flanges, one set forming a pivotal connection for the parts and the other abutting stops for limiting the unfolding movement of the leg.

PHILIP W. TIERNEY.

Copies of this patent may be obtained for five cents each, by addressing the "Commissioner of Patents, Washington, D. C."